May 10, 1932.   A. D. SUND   1,857,668

BUMPER FOR DUST MOPS AND BROOMS

Filed Dec. 17, 1929

INVENTOR.
Alfred D Sund
BY Harry C. Schroeder
ATTORNEY

Patented May 10, 1932

1,857,668

UNITED STATES PATENT OFFICE

ALFRED D. SUND, OF SANTA ROSA, CALIFORNIA

BUMPER FOR DUST MOPS AND BROOMS

Application filed December 17, 1929. Serial No. 414,690.

The invention is for a bumper for brushes, dust mops and similar cleaning implements.

The object of the invention is to provide a bumper for brooms, brushes, dust mops and similar implements, which can readily be attached to, or detached from the handle of the cooperating device, and in which the resilient bumper member may readily be replaced or removed.

Another object of the invention is to provide a device of the class described which may be attached to the handle of a brush, dust mop or broom, whereby dirt and dust accumulations may be effectively removed from the bristles, cords or fabric of the cleaning implement by inertia of said dirt and dust, and vibration set up in said bristles when said cleaning implement is caused to strike an object contacting primarily with said bumper, the contacting end of said bumper being formed of resilient material, thus preventing damage to the handle of the cleaning implement, and, the resilient contacting end of said bumper being readily replaceable and firmly retained.

Other objects of the invention will become apparent as the description is set forth and from the appended claims, and it will be understood that various changes in form, proportion and minor details of construction may be resorted to without departing from the spirit or scope of the invention or sacrificing any of the advantages thereof.

Figure 1:
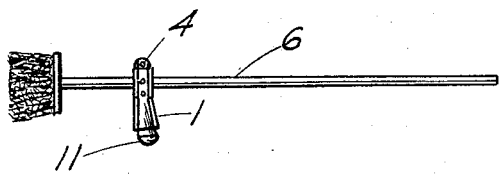
Fig. 1 is a view of the invention as applied to a dusting brush.
Figure 2:
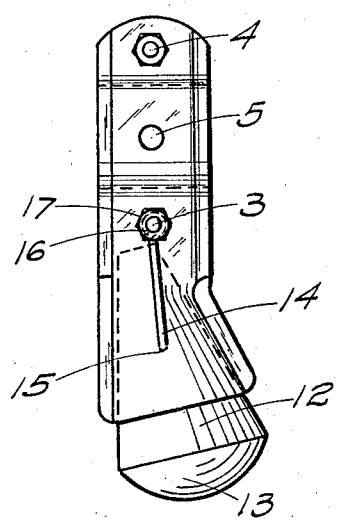
Fig. 2 is a side elevation of the device.
Figure 3:
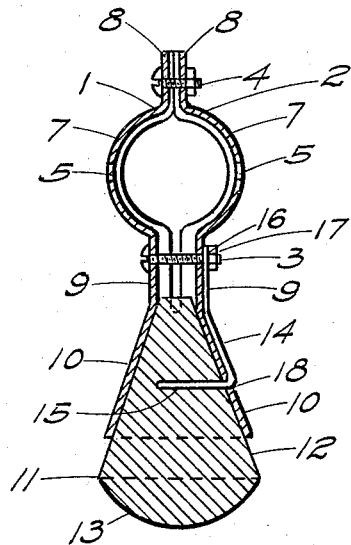
Fig. 3 is a transverse sectional elevation of the device.

The invention comprises a pair of oppositely disposed, similarly formed body members 1 and 2 provided with apertures to receive bolts 3 and 4. Apertures 5 are provided, whereby a pin or bolt may be projected through the handle 6 to prevent rotation of the device on the handle 6. The body members 1 and 2 are arcuately formed, as indicated at 7, terminating in a flange end 8, through which clamping bolt 4 secures the two body members. Oppositely continuing from the arcuately formed section 7, a section 9 in parallel relation with flange end 8 is provided for reception of the clamp bolt 3, thence continuing to a conical form, with the axis of the cone 10, in angular relation to the axis of the arcuate section 7, and the base of cone 10 constituting the opposite ends of the body members 1 and 2.

A resilient bumper 11 is provided to fit into the conical end 10 of the body members 1 and 2, said bumper comprising a frusto-conical resilient member 12 terminating in a spherical segment 13. A pin 14 is provided to cooperate with an aperture 15 in and adjacent the apex of the bumper 11 for retaining the bumper in the conical end 10 of body members 1 and 2. Pin 14 is formed so as to pass through the bumper 11 approximately at right angles to the axis of the cone 10, and through an aperture 18 in body member 2 and thence angularly formed to pass along the body member 2 to bolt 3, where an eye 16 is formed cooperating with bolt 3, the bolt 3 retaining the pin 14 in relative position.

For use, the handle of the cleaning implement is passed through the arcuately formed section 7, the device being disposed adjacent the brush or mop head. Clamp screws 3 and 4 are drawn up tight, thereby securing the bumper in position. When removing dust and dirt from the cleaning implement, it is merely necessary to strike the resilient bumper member against, or by an object with sufficient force to cause dislodgment of the dirt and dust particles, repeating the operation to a satisfactory removal of said dust and dirt.

When it is desired to replace the resilient bumper member 11, it is merely necessary to remove nut 17, which allows pin 14 to be removed, freeing bumper 11. The new bumper is placed in position with holes 18 and 15 in register, the eye 16 placed over bolt 3 and nut 17 drawn up.

I claim:—

1. A bumper leg for a broom comprising a pair of cooperating members of opposite form secured together by means of a pair of clamp bolts, and forming when secured together, an encompassing clamp between said bolts, and a conical bumper receiving socket beyond one of said bolts, and a resilient bumper in said socket.

2. A bumper leg for a broom comprising two rigid members of opposite form, and forming, when secured together in cooperative relation, an encompassing clamp adjacent one end and a pair of clamp bolts for said clamp, and a conical bumper receiving socket at the opposite end, a resilient bumper disposed in said socket, aligned apertures in said bumper and said socket, a pin in said apertures and having an extension cooperating with one of said clamp bolts.

3. A bumper leg for a broom comprising a resilient bumper, a pair of clamp bolts, two oppositely formed members detachably secured together by means of said clamp bolts, each of said members consisting of a semi-cylindrical portion for clamping the handle of a broom and an integral half cone portion for said resilient bumper.

In testimony whereof I have affixed my signature.

ALFRED D. SUND.